(12) United States Patent
Lichauer et al.

(10) Patent No.: US 10,746,697 B2
(45) Date of Patent: Aug. 18, 2020

(54) POSITION-BASED SAMPLING FOR EDDY CURRENT INSPECTION OF STEAM GENERATOR TUBES

(71) Applicant: WESTINGHOUSE ELECTRIC COMPANY LLC, Cranberry Township, PA (US)

(72) Inventors: John C. Lichauer, Irwin, PA (US); Daniel C. Wood, Greensburg, PA (US); Thomas W. Nenno, Murrysville, PA (US); Qui V. Le, Pittsburgh, PA (US); Kyle M. Flanigan, Canonsburg, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 197 days.

(21) Appl. No.: 15/810,333

(22) Filed: Nov. 13, 2017

(65) Prior Publication Data
US 2018/0284067 A1  Oct. 4, 2018

Related U.S. Application Data

(60) Provisional application No. 62/478,226, filed on Mar. 29, 2017.

(51) Int. Cl.
 G01N 27/90 (2006.01)
 G01N 27/82 (2006.01)
 G01N 27/83 (2006.01)

(52) U.S. Cl.
 CPC ....... *G01N 27/9046* (2013.01); *G01N 27/902* (2013.01); *G01N 27/908* (2013.01)

(58) Field of Classification Search
 CPC . G01N 27/9046; G01N 27/902; G01N 27/908
 (Continued)

(56) References Cited

U.S. PATENT DOCUMENTS 4,876,506 A    10/1989  Brown et al.
 7,733,084 B1    6/2010  O'Dell et al.
 (Continued)

FOREIGN PATENT DOCUMENTS

JP      2002365271 A    12/2002
 KR   1003735140000 B1    3/2003

OTHER PUBLICATIONS

International Search Report and Written Opinion of the International Searching Authority for PCT/US2018/021525 dated Jun. 18, 2018 (Forms PCT/ISA/220, PCT/ISA/210 and PCT/ISA/237).

*Primary Examiner* — Reena Aurora
(74) *Attorney, Agent, or Firm* — K&L Gates LLP

(57) ABSTRACT

A method of employing an eddy current sensor to perform an inspection of a tube of a steam generator involves accelerating and decelerating the eddy current sensor in a predetermined fashion that substantially reduces the likelihood of damage to the eddy current sensor. The reduction of probe stresses reduces radiological waste and reduces radiation exposure to workers involved in changing damaged probes The recording of an eddy current signal at each of a plurality of equally spaced apart locations along the tube permits the velocity of the eddy current sensor to be varied without compromising the validity of the data that has been recorded. The inspection system employs an encoder that outputs a series of signals as the probe is advanced incremental distances within the tube of the steam generator, and eddy current sensor signals are recorded responsive to at least some of the signals from the encoder.

14 Claims, 4 Drawing Sheets

(58) Field of Classification Search
USPC .......................................................... 324/240
See application file for complete search history.

(56) References Cited

U.S. PATENT DOCUMENTS

| 8,390,278 B2 * | 3/2013 | Petrosky | G01N 27/90 |
| | | | 324/220 |
| 2005/0039343 A1 | 2/2005 | Catalano | |

* cited by examiner

POSITION-BASED SAMPLING FOR EDDY CURRENT INSPECTION OF STEAM GENERATOR TUBES

CROSS REFERENCE TO RELATED APPLICATION

The instant application claims priority from U.S. Provisional Patent Application Ser. No. 62/478,226 filed Mar. 29, 2017, the disclosures of which are incorporated herein by reference.

BACKGROUND

Field

The disclosed and claimed concept relates generally to steam generators and, more particularly, to an inspection system and an associated method of inspecting the tubes of a steam generator.

Related Art

It is known to perform eddy current inspections on the tubes of steam generators of nuclear power plants and the like. During such inspection, a probe having an eddy current sensor is moved through a tube of the steam generator while the response signal from the eddy current sensor is sampled and recorded at fixed time intervals. The probe is accelerated to a constant velocity and the speed is set to so that twenty-five samples per inch or as many as forty samples per inch are recorded, by way of example. Most typically, however, a prior eddy current inspection of the steam generator is consulted, and the current testing of the same steam generator is typically tailored to follow the parameters of the prior testing in terms of probe speed and time between successive recordings of measurements. This is done in order to enable a meaningful comparison between the current eddy current data on a tube and the prior eddy current data on the same tube. While such eddy current testing has been generally effective for its intended purposes, it has not been without limitation.

As is generally understood in the relevant art, each tube of a steam generator has a pair of straight portions that are mounted in a tube sheet plus a bend that is situated between the pair of straight portions opposite the tube sheet. In order to perform an eddy current analysis of a tube, the probe typically is received in a first end of the tube and is advanced along the tube until the eddy current sensor protrudes out of the second, opposite end of the tube. In so doing, the probe typically is advanced another ten to forty inches beyond the open second end of the tube in order that the eddy current sensor and a length of the communication cable that extends from the eddy current sensor protrude from the second end of the tube. During such initial advancement of the probe into the tube from the first end to the second end, no measurement is taken. However, the probe is then pulled from the second end of the tube back toward the first end of the tube during what can be characterized as a detection pass. The detection pass occurs at a fixed velocity, and eddy current signals are recorded at predetermined time intervals that are a fixed time interval apart from one another.

In order to maintain the eddy current sensor at a fixed velocity within the tube during the detection pass, the probe typically must be rapidly accelerated from a standing stop in order that the eddy current sensor will have reached the fixed velocity by the time it reenters the second end of the tube on its detection pass. During such acceleration, the eddy current sensor often can impact the second end of the tube at the tube sheet as it enters the tube for its detection pass, which can result in damage to the eddy current sensor. Moreover, the eddy current sensor can be damaged as it travels through the bend since the bend alters the straight-line path of the eddy current sensor as it leaves the straight portion and travels through the bend toward the first end of the tube.

The damage to the eddy current sensor can result in significant cost, because an eddy current sensor can cost several thousand dollars, and sometimes an inspection team can destroy one or more dozens of eddy current sensors in the inspection of a single steam generator. The cost in replacing eddy current sensors alone is substantial. Moreover, a used and destroyed eddy current sensor is considered to be radioactive, and thus special radioactive waste procedures must be followed in order to dispose of a used/destroyed eddy current sensor, thereby further increasing cost.

Furthermore, eddy current signals that are recorded at fixed time intervals can sometimes be inaccurate because in certain instances the eddy current sensor sometimes may not be traveling at the desired fixed velocity, such as when the eddy current sensor first enters the tube at the tube sheet. If the eddy current sensor is traveling at a velocity below the desired fixed velocity, the recorded data points that had been recorded at a fixed time interval might be representative of tube positions that are spaced relatively closer together than the data points taken of other parts of the tube. The likely result of a failure of the eddy current sensor to travel at the assumed fixed velocity is that the eddy current sensor signals that are being recorded during a current inspection might not easily be compared with historic eddy current sensor signals that had perhaps been recorded more accurately. This can result in needing to repeat the inspection on a given tube, which further increases cost. Improvements thus would be desirable.

SUMMARY

Accordingly, an improved method of employing an eddy current sensor to perform an eddy current inspection of a tube of a steam generator involves accelerating and decelerating the eddy current sensor in a predetermined fashion that substantially reduces the likelihood of damage to the eddy current sensor during the inspection process. The removal of this damage mechanism (probe stresses) ultimately reduces radiological waste and reduces radiation exposure to workers involved in changing out damaged probes The recording of an eddy current signal from the eddy current sensor at each of a plurality of equally spaced apart locations along the tube permits the velocity of the eddy current sensor to be varied without compromising the validity of the data that has been recorded. The inspection system employs an encoder that is situated on a roller which is used in feeding the eddy current probe into and out of the tube of the steam generator. The encoder outputs a series of signals as the probe is advanced incremental distances, and eddy current sensor signals are recorded responsive to at least some of the signals from the encoder.

An aspect of the disclosed and claimed concept is to provide an improved method of employing an eddy current sensor to perform an inspection on a tube from among a plurality of tubes of a steam generator of a nuclear installation, the eddy current sensor being structured to output an eddy current signal, the tube having a first straight portion, a second straight portion, and a bend situated between the first and second straight portions. The method can be generally stated as including accelerating the eddy current sensor to be moving at a first velocity within the first straight portion in a direction toward the bend, and decelerating the eddy current sensor to be moving at a second velocity less that the first velocity within the first straight portion in a direction toward the bend as the eddy current sensor reaches the bend.

Another aspect of the disclosed and claimed concept is to provide an improved inspection system usable to perform an inspection of a steam generator that comprises a plurality of tubes. The inspection system can be generally stated as including an eddy current probe that can be generally stated as including an eddy current sensor that is structured to output an eddy current signal, a drive mechanism that is cooperable with the eddy current probe to move the eddy current sensor with respect to a tube of the plurality of tubes, the drive mechanism can be generally stated as including an encoder that is structured to generate a series of outputs, each output of the series of outputs being representative of a successive movement of a predetermined distance of the eddy current sensor with respect to the tube, a computer that is structured to detect the series of outputs and to record the eddy current signal, the computer can be generally stated as including a processor apparatus that can be generally stated as including a processor and a storage, the storage having stored therein a number of routines which, when executed on the processor, cause the inspection system to perform operations that can be generally stated as including operating the drive mechanism to move the eddy current sensor with respect to the tube, outputting from the encoder the series of outputs, employing the computer to detect the series of outputs and, responsive to each of at least some of the outputs of the series of outputs, triggering the computer to store the eddy current signal.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the Specification.

DESCRIPTION

Figure 1:
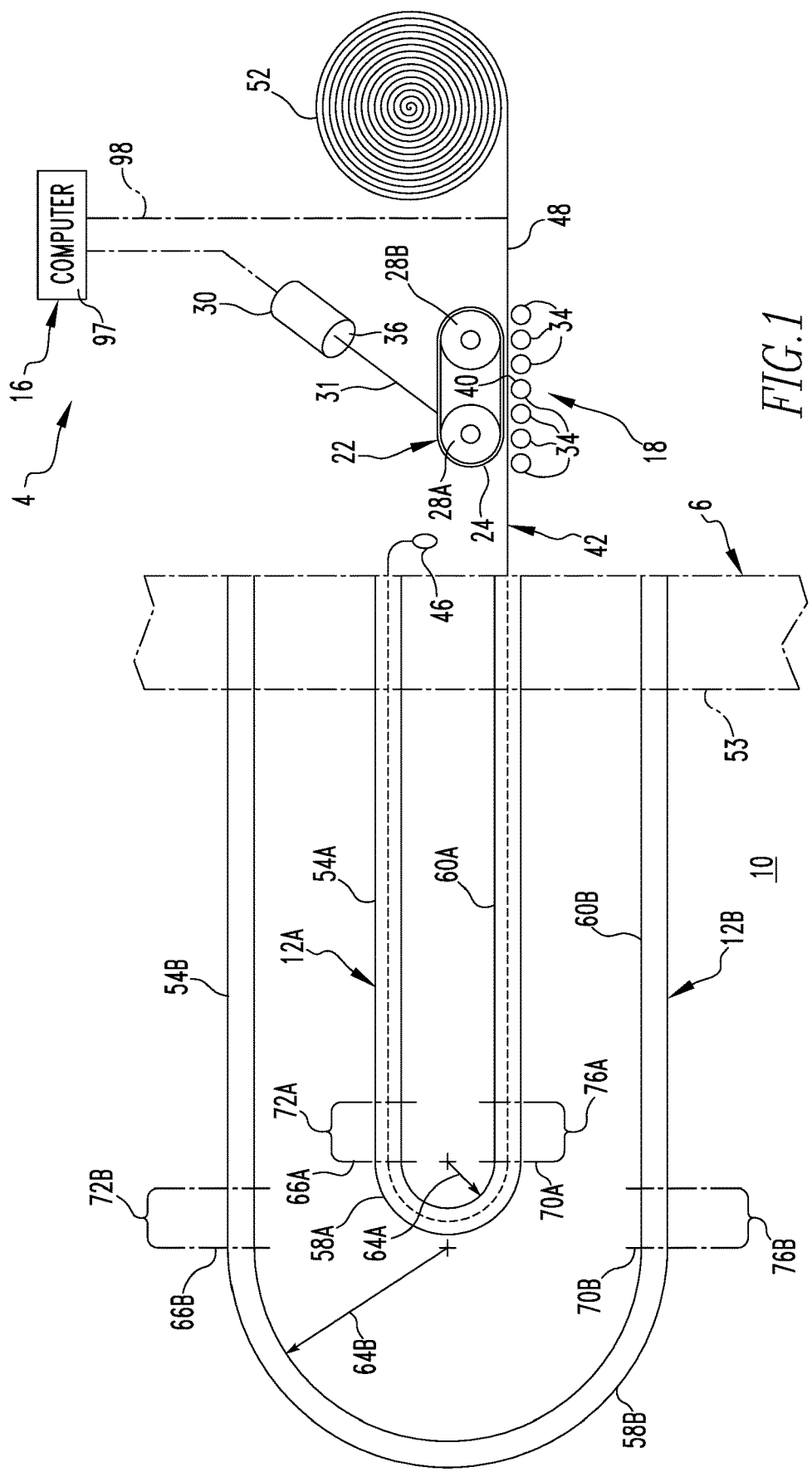
FIG. 1 is a schematic depiction of an improved inspection system in accordance with the disclosed and claimed concept performing an inspection method that is also in accordance with the disclosed and claimed concept on a steam generator of a nuclear installation.

An improved inspection system 4 in accordance with the disclosed and claimed concept is depicted generally in FIG. 1. The inspection system 4 is usable on a steam generator 6 of a nuclear installation 10 in order to perform eddy current testing thereon. The steam generator 6 includes a plurality of tubes 12, two of which are depicted in FIG. 1 at the numerals 12A and 12B, and which can collectively or individually referred to herein with the numeral 12. It is understood that the steam generator 6 includes many more tubes 12 than are expressly depicted in FIG. 1. While FIG. 1 depicts a pair of tubes that each have approximately the same height, i.e., as indicated in the horizontal direction from the perspective of FIG. 1, it is understood that other tubes 12 may be of different dimensions, and most typically as the radius of the bend increases, the height increases, and the tubes 12 which have the relatively larger bend radii typically fit over the tubes 12 having the relatively smaller bend radii.

The inspection system 4 can be said to include a computer 16 and a detection apparatus 18 that are cooperable with one another. The detection apparatus 18 includes a drive mechanism 22 that includes an endless belt 24 that extends about a pair of pulleys 28A and 28B. The drive mechanism 22 further includes a motor 30 that is operatively connected with the pulley 28A and further includes a set of rollers 34 that are situated adjacent the belt 24 and that are freely rolling.

The drive mechanism 22 additionally includes a motor encoder 36 that is situated in proximity to the motor 30 and which detects rotation of a shaft 31 of the motor 30. The drive mechanism 22 further includes a roller encoder 40 that is situated in proximity to one of the rollers 34 and which detects rotation of the one of the rollers 34. The motor encoder 36 and the roller encoder 40, in response to detecting the rotation of the motor shaft 31 and the one of the rollers 34, respectively, each output a series of drive signals in the form of electronic pulses. Each electronic pulse of the series of electronic pulses that is output by the motor encoder 36 is an output that is representative of an incremental rotation of the motor shaft 31 by a predetermined and fixed angular rotational distance about its axis of rotation. Likewise, each electronic pulse of the series of electronic pulses that is output by the roller encoder 40 is an output that is representative of an incremental rotation of the one of the rollers 34 by a predetermined and fixed angular rotational distance about its axis of rotation.

The predetermined and fixed angular rotational distance of the motor shaft 31 that results in the outputting of an electronic pulse from the motor encoder 36 need not necessarily be the same as the predetermined and fixed angular rotational distance of the one of the rollers 34 that results in the outputting of an electronic pulse from the roller encoder 40, and likely the two will not be the same. The series of electronic pulses from the motor encoder 36 and the roller encoder 40 are received by an eddy current test instrument 98 that interfaces with the computer 16 by LAN cable (Ethernet) and thus communicates the eddy current signals to the computer 16 which stores the eddy current signals. In the depicted exemplary embodiment, the eddy current test instrument 98 is situated largely within the reel 52 and thus is depicted schematically in FIG. 1. While either series of electronic pulses could be used to trigger the recording of eddy current signals, it is noted that the drive signals from the roller encoder 40 are used by the eddy current text instrument 98 to trigger the recording of eddy current signals by the computer 16 in the depicted exemplary embodiment.

The detection apparatus 18 additionally includes an eddy current probe 42 that includes an eddy current sensor 46 and an elongated and flexible communication cable 48, with the eddy current sensor 46 being situated at the end of the communication cable 48. The communication cable 48 itself is releasably and retractably stored on a movable reel 52 that stores the communication cable 48 thereon when the eddy current probe 42 is withdrawn from the tube 12 and also pays out the communication cable 48 when the eddy current probe 42 is being received in one of the tubes 12. The eddy current sensor 46 outputs an eddy current signal in a known fashion that is transmitted along the communication cable 48 and which is received by the eddy current test instrument 98.

As noted above, the signals that are received from the roller encoder 40 are used by the eddy current test instrument 98 to trigger the recording on the computer 16 of an eddy current signal from the eddy current sensor 46. That is, as the electronic pulses are generated by the roller encoder 40 and are received electronically by the eddy current test instrument 98. The encoder pulses are transmitted to the eddy current test instrument 98 by the communications cable 48. Alternatively, the eddy current test instrument 98 may be a card mounted in the computer 16. The reception of at least some of the electronic pulses by the eddy current text instrument 98 triggers the computer 16 to record the eddy current signal data that is instantaneously being generated by the eddy current sensor 46 and is being communicated via the communications cable 48 and the eddy current test instrument 98 to the computer 16.

As can be understood from FIG. 1, the communication cable 48 is tightly interposed between the belt 24 and the rollers 34. It thus can be understood that rotation of the shaft 31 by operation of the motor 30 results in corresponding movement of the belt 24 about the pulleys 28A and 28B and resultant movement of the eddy current probe 42 with respect to the tube 12 as well as resultant rotation of the rollers 34. As such, it can be understood that each rotation of the shaft 31 by a predetermined and fixed angular rotational distance is therefore also representative of an incremental movement of the eddy current probe 42 a predetermined linear distance along and with respect to the tube 12. As such, each electronic pulse from the motor encoder 36 is representative of an incremental movement of the eddy current probe 42 the predetermined linear distance along and with respect to the tube 12. In a similar fashion, each rotation of the one of the one of the rollers 34 by another predetermined and fixed angular rotational distance is representative of an incremental movement of the eddy current probe 42 another predetermined linear distance along and with respect to the tube 12. Likewise, each electronic pulse from the roller encoder 40 is therefore representative of an incremental movement of the eddy current probe 42 the another predetermined linear distance along and with respect to the tube 12. It is understood that the predetermined and fixed angular rotational distance that results in the outputting of an electronic pulse from the motor encoder 36 is not necessarily equal to the predetermined and fixed angular rotational distance that results in the outputting of an electronic pulse from the roller encoder 40. As such, the series of pulses that are output by the motor encoder 36 may be representative of incremental movements of the eddy current probe 42 that are of fixed distances that are different than the fixed distances that are represented by the series of pulses that are output by the roller encoder 40.

The steam generator 6 includes a tube sheet 53 to which the tubes 12 are mounted. As can be seen in FIG. 1, the tube 12A can be said to include a first straight portion 54A, a bend 58A, and a second straight portion 60A. The bend 58A is situated between and is connected with the first and second straight portions 54A and 60A and is of a radius 64A. In a similar fashion, the tube 12B has a first straight portion 54B, a bend 58B, and a second straight portion 60B. The bend 58B is situated between and is connected with the first and second straight portions 54B and 60B and is of a radius 64B. The first straight portions 54A and 54B may be collectively or individually referred to herein with the numeral 54. The bends 58A and 58B may be collectively or individually referred to herein with the numeral 58. The second straight portions 60A and 60B may be collectively or individually referred to herein with the numeral 60.

In the depicted exemplary embodiment, the eddy current probe 42 is depicted as being situated in the interior of the tube 12A, specifically with the communications cable 48 extending though the length of the tube 12A, and with the eddy current sensor 46 being situated outside the open end of the first straight portion 54A and dangling from an end of the communications cable 48 that protrudes beyond the open end of the first straight portion 54A adjacent the tube sheet 53. When the eddy current probe 42 is being removed from the tube 12A, the communications cable 48 will start to be withdrawn from the interior of the tube 12A, which will initially cause the eddy current sensor 46 to be received in the opening at the end of the first straight portion 54A. Continued withdrawal of the communications cable 48 from the tube 12A will cause the eddy current sensor 46 travel along the first straight portion 54A in a direction toward the bend 58A until it reaches the bend 58A. Further continued withdrawal of the communications cable 48 from the tube 12A will cause the eddy current sensor 46 to then travel through the bend 58A and thereafter to travel through the second straight portion 60A until it reaches an open end of the second straight portion 60A adjacent the tube sheet 53, which is an opposite end of the tube 12A from where the eddy current sensor 46 entered the first straight portion 54A.

Furthermore, the tube 12A can be said to have a first tangent point 66A, which is the point at which the first straight portion 54A and the bend 58B are connected with one another, and which can be said to constitute an end of the bend 58A. The tube 12A further includes a second tangent point 70A which is the point at which the second straight portion 60A and the bend 58A are connected with one another and thus can be said to constitute another end of the bend 58A. Depending upon the particular implementation, the tube 12A may additionally have defined thereon a first buffer zone 72A and a second buffer zone 76A in the first and second straight portions 54A and 60A, respectively, extending from the first and second tangent points 66A and 70A, respectively, in a direction away from the bend 58A.

In a similar fashion, the tube 12B includes a first tangent point 66B and a second tangent point 70B between the first and second straight portions 54B and 60B and the bend 58B. In a further similar fashion, the tube 12B can include a first buffer zone 72B and a second buffer zone 76B extending from the first and second tangent points 66B and 70B, respectively, in a direction away from the bend 58B.

As can be seen in FIG. 1, the communication cable 48 of the eddy current probe 42 is received between the belt 24 and the rollers 34. When the motor 30 is energized or otherwise activated, it rotates the pulley 28A which causes the belt 24 to move, which causes the communication cable 48 that is engaged between the belt 24 and the rollers 34 to be moved in a direction either toward the tube sheet 53 or away from it, depending upon the direction in which the motor 30 is energized or otherwise activated. As the shaft of the motor 30 rotates, the motor encoder 36 outputs signals in the form of a series of electronic pulses as noted elsewhere herein. Each such electronic pulse results from and is representative of an incremental rotation of the shaft of the motor 30 by a predetermined angular rotation. In other embodiments, the pulley 28B could be used to move the belt 24, or another drive mechanism used to move the eddy current probe 42 with respect to the steam generator 6.

In a similar fashion, when the eddy current probe 42 is caused to move with respect to the steam generator 6 due to movement of the pulley 28A and corresponding movement of the belt 24 about the pulleys 28A and 28B and consequent movement of the communication cable 48 that is engaged between the belt 24 and the rollers 34, the one of the rollers 34 is caused to rotate (along with the other rollers 34), which results in the roller encoder 40 outputting another signal in the form of another series of electronic pulses that are each representative of an angular rotation of one of the rollers 34 by a predetermined angular rotational distance. In the depicted exemplary embodiment, the motor encoder 36 and the roller encoder 40 each output approximately 4,000-5,000 electronic pulses for every inch of movement of the eddy current probe 42 in a direction toward or away from the tube sheet 53. The electronic pulses that are output by the motor encoder 36 and the roller encoder 40 are not synchronized with one another and typically are not even of the same electronic pulse rate since the shaft of the motor 30 may not rotate with the same angular speed as the rollers 34. It is understood, however, that at a given velocity of the eddy current sensor 46 along the tube 12, the electronic pulse rate of the motor encoder 36 should be fixed and the electronic pulse rate of the roller encoder 40 should likewise be fixed, albeit the two might have different electronic pulse rates that are known to the computer 16.

A probe motion controller 97 (motion control card) that is connected with the computer 16 controls the drive motor 30 and receives the encoder electronic pulses from both the motor and roller encoders 36 and 40. This is where any unexpected difference in electronic pulse rates is detected. If the probe motion controller 97 detects an unexpected difference between the electronic pulse rates of the motor encoder 36 and the roller encoder 40, this might be indicative of slippage somewhere or some other failure. In a situation where an unexpected electronic pulse rate is detected from either or both of the motor encoder 36 and the roller encoder 40, the detected data will be marked as being unreliable, and the tube 12 will be re-inspected. For instance, data is stored in the probe motion controller 97 that is representative of any anticipated difference in electronic pulse rates of the motor and roller encoders 36 and 40. Based upon a particular electronic pulse rate from the motor encoder 36 the probe motion controller 97 will be able to determine what should be the electronic pulse rate of the roller encoder 40, and vice-versa, by way of example. Likewise, based upon the input to the drive motor 30, the probe motion controller 97 will be able to determine what should be the electronic pulse rates of the motor encoder 36 and the roller encoder 40, by way of further example. Inputs such as electronic pulse rates that are received by the probe motion controller 97 and that are other than what is expected are determined to be indicative of errors or problems with the one or more portions of the inspection system 4, with the result that the detected data will be marked "fail" as being unreliable, and the tube 12 will be re-inspected. Otherwise, and in the absence of any other problems with the data for a given tube 12 that may be detected by the probe motion controller 97, the data for the tube 12 is marked "pass". In the exemplary embodiment presented herein, the probe motion controller 97 is situated in a housing with the drive motor 30 and motor encoder 36, so the probe motion controller 97 is schematically depicted in FIG. 1 as being connected with the computer 16.

Information regarding the pass/fail is sent by the probe motion controller 97 to the computer 16. The probe motion controller 97 is in a housing which also contains the drive motor 30 and motor encoder 36.

The eddy current test instrument 98 receives the electronic pulses from the roller encoder 40 and, in the depicted exemplary embodiment, takes the eddy current samples. In other embodiments the eddy current test instrument 98 may merely instruct the computer 16 to record the output of the eddy current probe 42 at various times or may take other actions based upon the electronic pulses that are detected from the roller encoder 40. The eddy current test instrument 98 is attached to the reel 52. Both the probe motion controller 97 and the eddy current test instrument 98 interface with the computer 16 by LAN cable (Ethernet). Either of both of the probe motion controller 97 and the eddy current test instrument 98 may be implemented as special cards in the computer 16, but in the depicted exemplary embodiment they are components that are separate from the computer 16.

Figure 2:
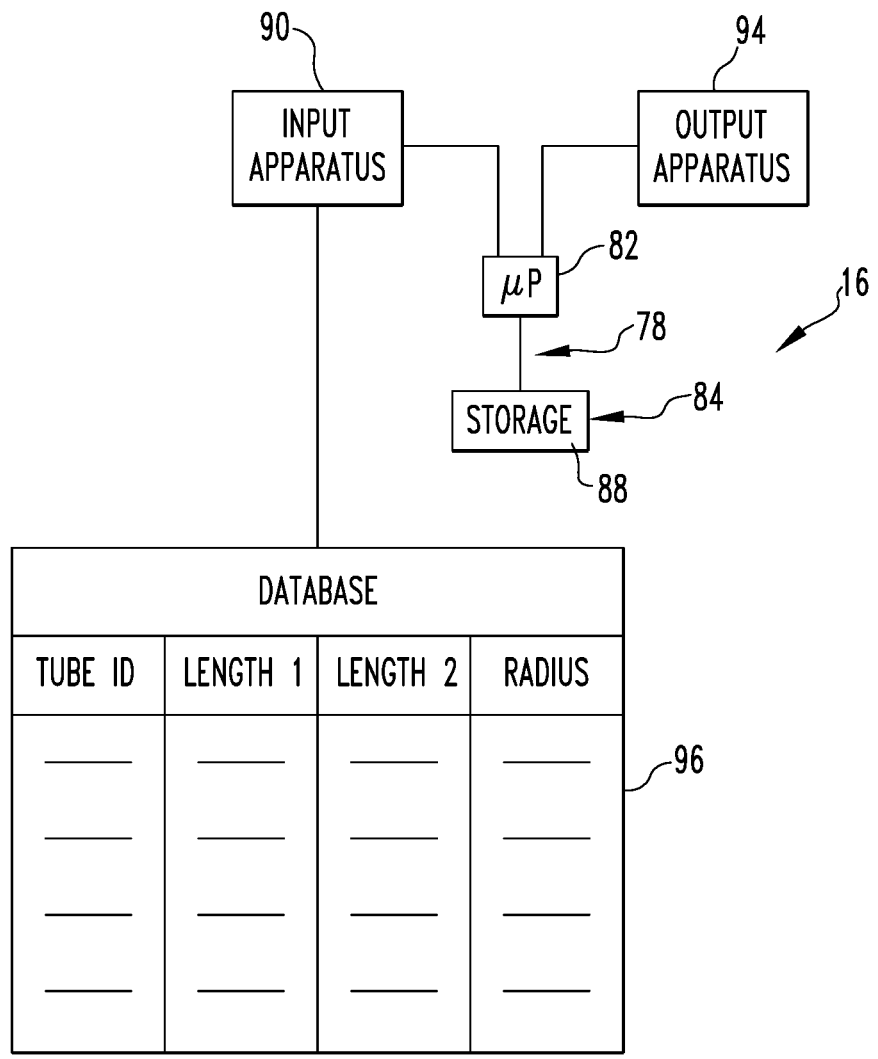
FIG. 2 is a schematic depiction of a processor apparatus of the inspection system of claim 1 and a database connected therewith.

As can be seen in FIG. 2, the computer 16 can be said to include a processor apparatus 78 that includes a processor 82 and a storage 84 that are in communication with one another. The processor 82 can be any of a wide variety of processors, such as a microprocessor, by way of example and without limitation. The storage 84 can be any of a wide variety of computer storage devices such as RAM, ROM, EPROM, FLASH, solid state drives, and the like and which can be either volatile or non-volatile storage. The storage 84 has a number of routines 88 stored therein that are executable on the processor 82 to cause the inspection system 4 to perform various operations. As employed herein, the expression "a number of" and variations thereof shall refer broadly to any non-zero quantity, including a quantity of one.

The computer 16 further includes an input apparatus 90 that provides input signals to the processor 82 and an output apparatus 94 that receives output signals from the processor 82. The output apparatus 94 can provide outputs such as visual outputs, electronic outputs, and the like without limitation. By way of example, components of the output apparatus 94 interfaces with the probe motion controller 97 which controls the motor 30 in order to move the eddy current probe 42 with respect to the tubes 12. By way of further example, components of the input apparatus 90 may receive from the eddy current test instrument 98 the eddy current signal that is output by the eddy current sensor 46. Components of the input apparatus 90 likewise would receive the series of electronic pulses that are output by the motor encoder 36 and the roller encoder 40. Other examples will be apparent.

In the depicted exemplary embodiment, the computer 16 has access to a database 96 that is specific to the steam generator 6 and which includes an identity of each tube 12 of the steam generator 6 and which further includes, for each such tube 12, the length of the first straight portion, the length of the second straight portion (which typically will be equal to the length of the first straight portion), and a radius of the bend that is interposed between the first and second straight portions. Such dimensions of each such tube 12 are used to determine a velocity profile of the eddy current sensor 46 for each such tube 12 that will dictate the movement of the eddy current sensor 46 when moving through such tube on a detection pass. The velocity profile is determined in so as to minimize the likelihood of damage to the eddy current sensor 46.

More specifically, the eddy current testing of a tube 12 such as the tube 12A begins with the eddy current probe 42 situated in a fashion such as is depicted generally in FIG. 1, with the eddy current probe 42 being stationary with respect to the tube 12A. In order to avoid damage to the eddy current sensor 46 as it enters the opening at the end of the first straight portion 54A at the tube sheet 53, the motor 30 will be energized or otherwise operated to gently accelerate the eddy current sensor 46 at, for example, twenty-five inches per second squared or, perhaps, fifty inches per second squared. In this regard, it is understood that the rotational velocity of the motor 30 is controlled by the probe motion controller 97 in accordance with the velocity profile of the particular tube, which is tube 12A in the instant example, in order to cause the eddy current sensor 46 to move at velocities and with accelerations that are in accordance with the particular velocity profile.

Such acceleration of the eddy current sensor by the motor 30 will continue until the eddy current sensor 46 reaches a predetermined velocity within the first straight portion 54A in a direction toward the bend 58A, after which the acceleration will typically cease and the eddy current sensor 46 will typically continue at the predetermined velocity along at least a portion of the first straight portion 54A. The predetermined velocity of the eddy current sensor 46 in the first straight portion 54A might be, for example, 120 inches per second, although other velocities can be employed.

As the eddy current sensor 46 begins to approach the bend 58A, the eddy current sensor 46 will be decelerated at, for example, 100 inches per second squared in order to ensure that the eddy current sensor 46 is at an appropriately slower velocity when it enters and traverses the bend 58A. In the tube 12 having the smallest radius, which might be a radius of 2.2 inches, by way of example, the eddy current sensor 46 may travel through the bend thereof at a velocity of approximately 18 inches per second, for instance. By moving the eddy current sensor 46 through the bend 58A at a relatively slow velocity compared with the velocity thereof in the first straight portion 54A, impacts between the eddy current sensor 46 and the interior of tube 12A within the bend 58A are reduced and are minimized, thus likewise minimizing damage to the eddy current sensor 46. After the eddy current sensor 46 has exited the bend 58A, the eddy current sensor 46 will again be accelerated at, for example, 100 inches per second squared until it reaches a velocity in the second straight portion 60A of, for example, 120 inches per second in a direction traveling away from the bend 58A.

If desired, the eddy current sensor 46 can thereafter be decelerated at, for instance, 100 inches per second squared, to a velocity of zero at the end of the second straight portion 60A where it terminates at an open end adjacent the tube sheet 53, which would necessitate the eddy current sensor 46 being removed from the end of the tube 12. Alternatively, the eddy current sensor 46 can be decelerated at the same or a different acceleration rate to a very slow velocity when it exits the second straight portion 60A at the tube sheet 53 at the very slow velocity. Still similarly, the eddy current sensor 46 might not be decelerated as it exits the tube 12A, and may simply exit the tube 12A at the same fixed speed at which it traversed the second straight portion 60A.

It is expressly noted that the roller encoder 40, during all of the aforementioned movements of the eddy current sensor 46 through the tube 12A, will be outputting a series of electronic pulses that are each representative of an incremental movement by a fixed distance of the eddy current sensor 46 along the tube 12A. The eddy current test instrument 98 receives the eddy current signals from the eddy current sensor 46 and transmits to the computer 16 samples of the eddy current signals that are recorded responsive to the electronic pulses from the roller encoder 40.

The routines 88 cause the computer 16 to record and store in the storage 84 a sample of the eddy current signal from the eddy current sensor 46 that was recorded at each of a plurality of equally spaced apart locations along the length of the tube 12 based upon at least some of the electronic pulses that were generated by the roller encoder 40. That is, and as noted above, the roller encoder 40 might output, for instance, 4,000 electronic pulses per inches of travel of the eddy current sensor 46 along the tube 12A. For inspections of the steam generator 6, the computer 16 may record perhaps forty eddy current measurements per inch of tube 12, so the computer 16 might record and store in the storage 84 an eddy current sample measurement for every 100 electronic pulses that are detected from the roller encoder 40, by way of example. In such a circumstance, the probe motion controller 97, the eddy current test instrument, 98 or other components of the computer 16 would, for instance, detect and count each electronic pulse that is output by the roller encoder 40 (or the motor encoder 36, for instance, in other embodiments). When the count of electronic pulses is anything between zero and ninety-nine, the computer 16 would not record any data from the eddy current test instrument 98. However, when the count of electronic pulses reaches one hundred (100), the eddy current test instrument 98 will trigger the computer 16 to responsively record the eddy current data output from the eddy current test instrument 98 and may optionally record other corresponding information such as a distance along the tube 12, a time value, and/or other information that corresponds with the recorded eddy current data. The count of electronic pulses would then be reset to zero, and the detection, counting, and recording process would continue.

The routines 88 employ the dimensional and other data in the database 96 for each tube 12 of the steam generator 6 to build for each such tube 12 a velocity profile that specifies the durations and magnitudes of each of the accelerations and decelerations and velocities of the eddy current sensor 46 for the tube 12 (or for each of a plurality of similar tubes) between a first end of the tube 12 and a second, opposite end of the tube 12 in order to minimize damage to the eddy current sensor 46 while maximizing testing speed. Such velocity profile is based upon the lengths of the first and second straight portions 54 and 60 and the fixed radius of the bend 58 situated therebetween for each tube 12 that is being inspected. For tubes having a bend 58 of a small radius, the velocity of the eddy current sensor 46 through such bend 58 will necessarily be relatively slower than the speed at which the eddy current sensor 46 will travel through a bend 58 of a larger radius.

In order to minimize damage to the eddy current sensor 46 while maximizing testing speed, it may be desirable to establish a fixed duration of time that the eddy current sensor 46 will take to traverse each bend 58. As such, bends 58 of a relatively smaller radius will be traversed at a relatively lower velocity of the eddy current sensor 46 as it travels through such bends 58, and bends 58 of a relatively larger radius will be traversed at a relatively higher velocity of the eddy current sensor 46.

For instance, and for the tube 12A, if the fixed radius of the bend 58A is 2.2 inches, a fixed velocity of eighteen inches per second in the bend 58A as well as in the first and second buffer zones 72A and 76A will take approximately 1.5 seconds for the eddy current sensor 46 to travel from the beginning of the first buffer zone 72A, through the first buffer zone 72A, through the bend 58A, and through the second buffer zone 76A to the end of the second buffer zone 76A. As such, when the velocity profile of the tube 12B is being calculated by the routines 88, the routines 88 might determine a velocity of the eddy current sensor 46 that will result in a travel time of 1.5 seconds from the beginning of the first buffer zone 72B, through the first buffer zone 72B, through the bend 58B, and through the second buffer zone 76B to the end of the second buffer zone 76B. Alternatively, the velocity profile of the tube 12B might be calculated by the routines 88 by determining a velocity of the eddy current sensor 46 that will result in a travel time of 1.5 seconds merely between the first and second tangent points 66B and 70B. That is, the first buffer zone 72B might be employed as the region within which the eddy current sensor 46 is decelerated from the relatively higher straight line velocity in the first straight portion 54B to the relatively lower velocity in the bend 58B, and the second buffer zone 76B might be employed as the region within which the eddy current sensor 46 is accelerated from the relatively lower velocity in the bend 58B to the relatively higher straight line velocity in the second straight portion 60B. The lengths of the various first and second buffer zones 72A, 72B, 76A, and 76B, meaning the parts of the first and second straight portions 54 and 60 that are additionally defined as being one of the first and second buffer zones 72A, 72B, 76A, and 76B, may vary depending upon the geometry and dimensions of the various tubes 12.

It is noted, however, that such velocity of the eddy current sensor 46 in the bends 58 may have its limitations, and it thus may be desirable to limit the velocity of the eddy current sensor 46 within each bend 58 to be no greater than the velocity of the eddy current sensor 46 in either of the first and second straight portions 54 and 60 that are adjacent such bend 58. As such, it may be the case that for certain tubes having a very large radius to its bend 58, the eddy current sensor 46 might not be decelerated prior to travel through the bend, and rather it may remain of a constant velocity through the bend 58 and through the adjacent portions of the first and second straight portions 54 and 60 of the tube 12. On the other hand, it may be desirable to perform at least a modest amount of deceleration to the eddy current sensor 46 before it enters the bend 58, such as in the first buffer zone 72A or 72B or otherwise, for instance, in order to further minimize potential damage to the eddy current sensor 46. This likely would be followed by an acceleration of the eddy current sensor 46 after it exits the bend 58 and is in the second buffer zone 76A or 76B or otherwise. Again, this would depend upon the dimensions of the tube 12.

Furthermore, it may be desirable to view the first and second buffer zones 72A and 76A as being parts of the bend 58A, in which case the eddy current sensor 46 would be decelerated within the first straight portion 54A to its lower velocity for its entire transit through the first buffer zone 72A, the bend 58A, and the second buffer zone 76A. The eddy current sensor would then be accelerated within the second straight portion 60A after exiting the second buffer zone 76A to a higher velocity for travel through the remainder of the second straight portion 60A. The use of such buffer zones may be deemed to be desirable in order to minimize the risk of damage to the eddy current sensor 46 in certain tubes 12 or in all of the tubes 12. The first and second buffer zones might be, for instance, ten inches or any other appropriate length that may vary depending upon the needs of the system to maximize inspection speed while minimizing potential damage to the eddy current sensor 46.

As noted above, the database 96 includes information on each tube 12 in the steam generator 6, and such information may include, for example, an identification of the tube 12, the lengths of the first and second straight portions 54 and 60, and the radius of the bend 58, among other possible information. The information in the database 96 pertaining to any particular tube 12 is used in order to determine the velocity profile of the eddy current sensor 46 for that tube 12. It is noted that the velocity profile for any given tube 12 may be likewise stored in the database 96 for possible future use, either for reuse during a future inspection, for use in evaluating whether "fail" data may be attributed to a velocity profile that was somehow faulty, and/or for other purposes.

As noted elsewhere herein, the velocity profile for an given tube 12 typically will be tailored in order to minimize potential damage to the eddy current sensor 46 while maximizing inspection speed. It is noted, however, that the various accelerations and decelerations of the eddy current sensor 46 and the resultant velocity of the eddy current sensor 46 can be advantageously selected independent of the need for recordation of eddy current signals at a rate of forty measurements per inch of tube since the recordation of the eddy current signal is triggered by the electronic pulses that are output from the roller encoder 40 in a fashion set forth above. As such, an eddy current signal sample for a given tube 12 is recorded in the storage 84 for each of a plurality of spaced apart locations along the length of the tube 12 based upon the electronic pulses that are output from the roller encoder 40.

Figure 3:
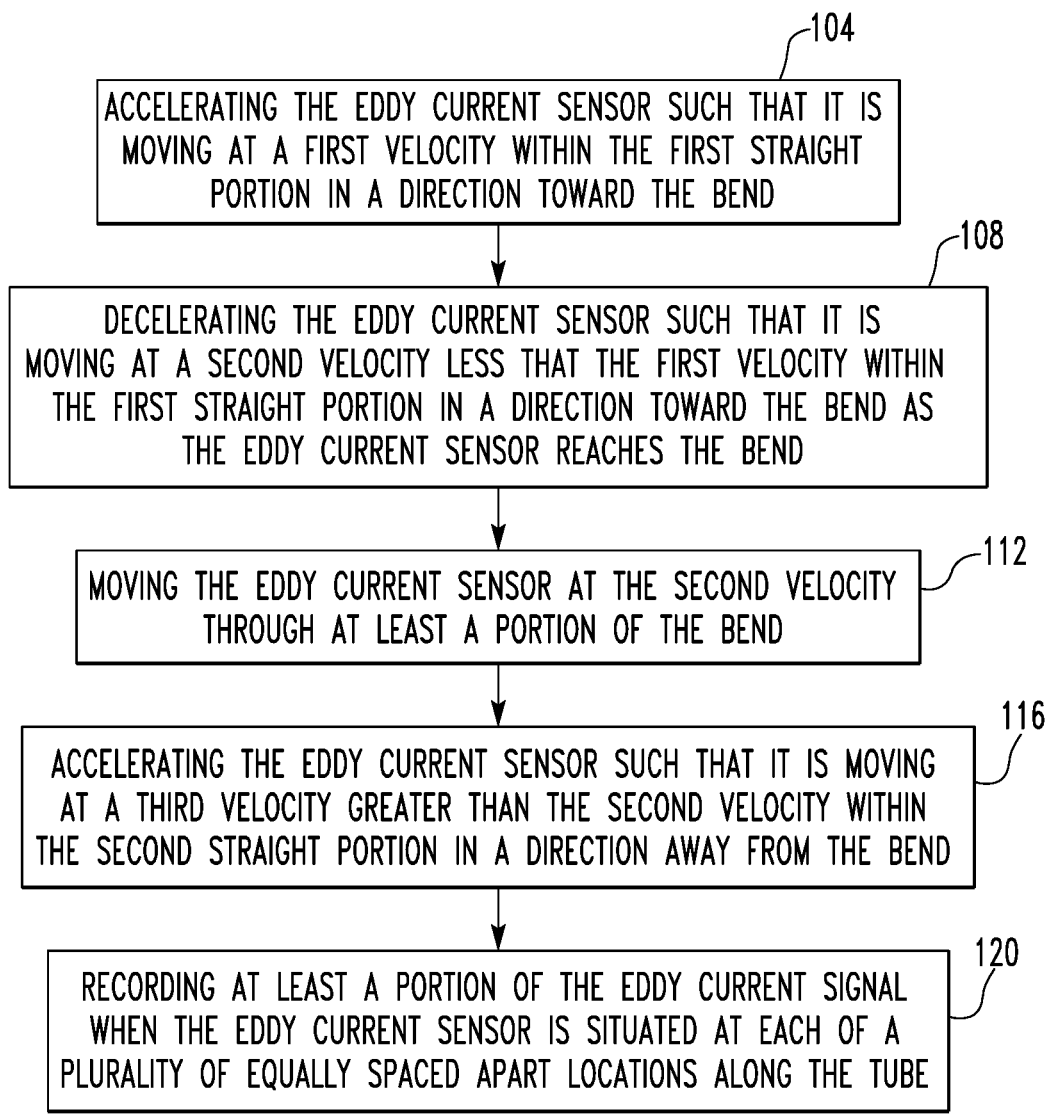
FIG. 3 in a first flowchart that depicts certain aspects of an improved method in accordance with the disclosed and claimed concept.
Figure 4:
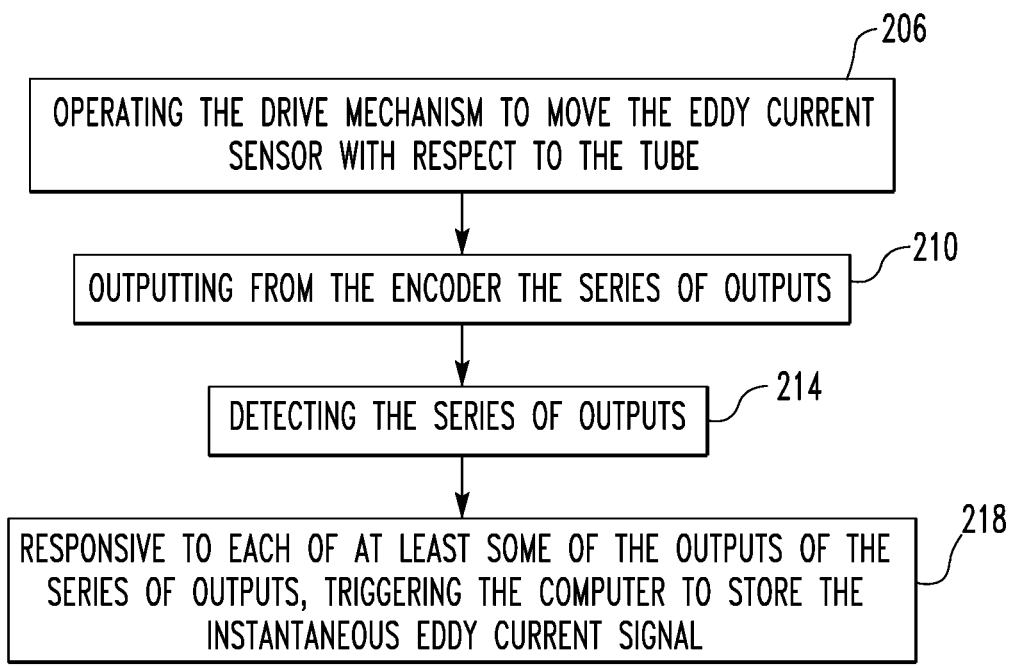
FIG. 4 is a second flowchart that depicts other aspects of another improved method in accordance with the disclosed and claimed concept.

An improved method of moving the eddy current probe 42 and performing an inspection operation therewith on the steam generator 6 of the nuclear installation 10 is depicted generally in a flowchart that is shown in FIG. 3. Although not explicitly shown in FIG. 3, the method generally begins with the eddy current probe 42 being situated as shown in FIG. 1 within a tube 12 of the steam generator 6. That is, the eddy current probe 42 will have been moved through the second straight portion 60, through the bend 58, and thereafter through the first straight portion 54 until the eddy current sensor 46 protrudes outwardly from the open end of the first straight portion 54 that terminates at a surface of the tube sheet 53. With the eddy current probe 42 situated as such, the method begins, as at 104, with accelerating the eddy current sensor 46 such that it is moving at a first velocity within the first straight portion 54 in a direction toward the bend 58. The method then continues, as at 108, with decelerating the eddy current sensor 46 such that it is moving at a second velocity less than the first velocity within the first straight portion 54 in a direction toward the bend 58 as the eddy current sensor 46 reaches the bend 58. The acceleration and deceleration that are depicted at 104, 108, and elsewhere herein, is performed by the probe motion controller 97 operatively connected with the motor 30 and with other portions of the drive mechanism 22.

The method then continues, as at 112, where the eddy current sensor 46 is moved at the second velocity through at least a portion of the bend 58. As noted elsewhere herein, the eddy current sensor 46 typically is moved through the entirety of the bend 58 at the second velocity. The method continues, as at 116, with accelerating the eddy current sensor 46 such that it is moving at a third velocity greater than the second velocity within the second straight portion 60 in a direction away from the bend 58. Such acceleration typically occurs in the second buffer zone 76. It is understood that the third velocity and the first velocity likely will be equal to one another, although this need not necessarily be the case. The method also includes, as at 120, recording at least a portion of the eddy current signal from the eddy current sensor 46 when the eddy current sensor 46 is situated at each of a plurality of equally spaced apart locations along the tube 12.

As noted elsewhere herein, such recording of the eddy current signal is triggered by at least some of the electronic pulses that are output by the roller encoder 40, although the electronic pulses that are used to trigger such recording can be detected from the motor encoder 36 depending upon the needs of the particular application. More specifically, the method can include, as at 206, operating the drive mechanism 22 to move the eddy current sensor 46 with respect to the tube 12. The method also includes, as at 210, outputting from the roller encoder 40 (and/or from the motor encoder 36, for instance) a series of outputs which, in the depicted exemplary embodiment, are in the form of electronic pulses. The method also includes detecting at least a portion of the series of outputs, as at 214. In the depicted exemplary embodiment, the eddy current text instrument 98 detects the electronic pulses and, when appropriate, triggers the computer 16 to record the eddy current data. The method also includes, as at 218, the triggering of the computer 16 to store the instantaneous eddy current signal from the eddy current sensor 46, or at least a portion of the instantaneous eddy current signal, in response to each of at least some of the electronic pulses of the series of electronic pulses.

It is noted that a second data reliability check is provided. The information in the database 96 pertaining to any particular tube 12 is used in order to determine the distance between landmarks within the tube 12. Landmarks might include, for instance, the first and second tangent point 66A, 66B, 70A, and 70B, the ends of the tubes, bracing structures to which the tubes are affixed, etc., by way of example and without limitation. Based on this known distance, the number of samples in the region between landmarks is calculated. Using the acquired eddy current signals, the software identifies the landmarks and determines the number of samples between the landmarks as represented in the eddy current data. If an unexpected difference between this calculated number and the actual number of samples present in the data is detected, the detected data will be marked as being unreliable, and the tube 12 will be re-inspected.

The information in the database 96 pertaining to any particular tube 12 is used in order to determine the width of landmark(s) within the tube 12. Based on this known width, the number of samples within the landmark is calculated. Using the acquired eddy current signals, the software identifies the landmark(s) and determines the number of samples within the landmark as represented in the eddy current data. If an unexpected difference between this calculated number and the actual number of samples present in the data is detected, the detected data will be marked as being unreliable, and the tube 12 will be re-inspected.

The improved inspection system 4 and method thus advantageously reduce the potential for damage to the eddy current sensor 46, thus saving cost in the replacement of the eddy current sensor 46, and further resulting in cost reduction due to avoided disposal fees for the disposal of a radioactive eddy current sensor 46. Furthermore, the recorded eddy current signals from the tube 12 are more reproducible and more accurate because they are equally spaced apart at various locations along the length of the tube rather than being based upon measurements that are taken based upon elapsed time and the mere hope that the eddy current sensor is traveling at a fixed velocity. This advantageously results in more data accuracy and less retesting of tubes. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of employing an eddy current sensor to perform an inspection on a tube from among a plurality of tubes of a steam generator of a nuclear installation, the eddy current sensor being structured to output an eddy current signal, the tube having a first straight portion, a second straight portion, and a bend situated between the first and second straight portions, the method comprising:
   accelerating the eddy current sensor to be moving at a first velocity within the first straight portion in a direction toward the bend; and
   decelerating the eddy current sensor to be moving at a second velocity less that the first velocity within the first straight portion in a direction toward the bend as the eddy current sensor reaches the bend.

2. The method of claim 1, further comprising moving the eddy current sensor at the second velocity through at least a portion of the bend.

3. The method of claim 2, further comprising accelerating the eddy current sensor to be moving at a third velocity greater than the second velocity within the second straight portion in a direction away from the bend.

4. The method of claim 3, further comprising recording at least a portion of the eddy current signal when the eddy current sensor is situated at each of a plurality of equally spaced apart locations along the tube.

5. The method of claim 1, further comprising recording at least a portion of the eddy current signal when the eddy current sensor is situated at each of a plurality of equally spaced apart locations along the tube.

6. The method of claim 1, further comprising:
   employing a drive mechanism to move the eddy current sensor through at least a portion of each of the first straight portion, the bend, and the second straight portion;
   receiving from the drive mechanism a series of outputs that are each representative of the eddy current sensor having been moved a predetermined distance along the tube; and
   responsive to at least a subset of the series of outputs, performing the recording.

7. The method of claim 1 wherein the bend has a radius, and further comprising moving the eddy current sensor along the bend from a beginning of the bend adjacent the first straight portion to an end of the bend adjacent the second straight portion according to a velocity profile that includes the second velocity such that the moving of the eddy current sensor from the beginning of the bend to the end of the bend takes a period of time.

8. The method of claim 7, further comprising performing an inspection on another tube from among the plurality of tubes, the another tube having another first straight portion, another second straight portion, and another bend situated between the another first straight portion and the another second straight portion, the another bend having another radius different than the radius, comprising moving the eddy current sensor along the another bend from a beginning of the another bend adjacent the another first straight portion to an end of the another bend adjacent the another second straight portion such that the moving of the eddy current sensor from the beginning of the another bend to the end of the another bend takes another period of time equal to the period of time.

9. An inspection system usable to perform an inspection of a steam generator that comprises a plurality of tubes, the inspection system comprising:

an eddy current probe comprising an eddy current sensor that is structured to output an eddy current signal;

a drive mechanism that is cooperable with the eddy current probe to move the eddy current sensor with respect to a tube of the plurality of tubes, the drive mechanism comprising an encoder that is structured to generate a series of outputs, each output of the series of outputs being representative of a successive movement of a predetermined distance of the eddy current sensor with respect to the tube;

a computer that is structured to detect the series of outputs and to record the eddy current signal, the computer comprising a processor apparatus that comprises a processor and a storage, the storage having stored therein a number of routines which, when executed on the processor, cause the inspection system to perform operations comprising:

operating the drive mechanism to move the eddy current sensor with respect to the tube;

outputting from the encoder the series of outputs;

employing the computer to detect the series of outputs; and responsive to each of at least some of the outputs of the series of outputs, triggering the computer to store the eddy current signal;

wherein the tube has a first straight portion, a second straight portion, and a bend situated between the first and second straight portions, and wherein the operations further comprise:

accelerating the eddy current sensor to be moving at a first velocity within the first straight portion in a direction toward the bend; and decelerating the eddy current sensor to be moving at a second velocity less that the first velocity within the first straight portion in a direction toward the bend as the eddy current sensor reaches the bend.

10. The inspection system of claim 9 wherein the operations further comprise moving the eddy current sensor at the second velocity through at least a portion of the bend.

11. The inspection system of claim 10 wherein the operations further comprise accelerating the eddy current sensor to be moving at a third velocity greater than the second velocity within the second straight portion in a direction away from the bend.

12. The inspection system of claim 11 wherein the operations further comprise recording at least a portion of the eddy current signal when the eddy current sensor is situated at each of a plurality of equally spaced apart locations along the tube.

13. The inspection system of claim 9 wherein the operations further comprise recording at least a portion of the eddy current signal when the eddy current sensor is situated at each of a plurality of equally spaced apart locations along the tube.

14. The inspection system of claim 9 wherein the computer has stored therein a database that comprises dimensional data pertaining to the tube and that further comprises data regarding a plurality of landmarks pertaining to the tube, and wherein the operations further comprise:

determining a distance between a pair of landmarks of the plurality of landmarks;

calculating an expected number of eddy current data samples between the pair of landmarks based at least in part upon the distance and the predetermined distance;

determining from the eddy current signal a detected number of data samples between the pair of landmarks;

determining that the expected number of eddy current data samples and the detected number of data samples are unequal in quantity and, responsive thereto, determining that the number of data samples are unreliable.

* * * * *